US012444371B2

(12) United States Patent
Chung et al.

(10) Patent No.: US 12,444,371 B2
(45) Date of Patent: Oct. 14, 2025

(54) DISPLAY APPARATUS

(71) Applicant: Samsung Display Co., LTD., Yongin-si (KR)

(72) Inventors: Jaemo Chung, Yongin-si (KR); Jongheon Han, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/645,802

(22) Filed: Apr. 25, 2024

(65) Prior Publication Data

US 2025/0087168 A1 Mar. 13, 2025

(30) Foreign Application Priority Data

Sep. 12, 2023 (KR) ........................ 10-2023-0121270

(51) Int. Cl.

*G09G 3/3266* (2016.01)
*G01R 31/52* (2020.01)
*G09G 3/00* (2006.01)
*G09G 3/3208* (2016.01)
*G09G 3/3275* (2016.01)

(52) U.S. Cl.

CPC ......... *G09G 3/3266* (2013.01); *G09G 3/3275* (2013.01); *G09G 2330/06* (2013.01); *G09G 2330/12* (2013.01)

(58) Field of Classification Search

CPC .... G09G 3/3266; G09G 3/3275; G09G 3/006; G01R 31/52

See application file for complete search history.

(56) References Cited

U.S. PATENT DOCUMENTS

| | | | |
|---|---|---|---|
| 7,372,680 B2 | 5/2008 | Suh | |
| 8,063,865 B2 | 11/2011 | Ishii et al. | |
| 9,960,222 B2 * | 5/2018 | Gai ...................... | H10K 50/824 |
| 10,861,361 B2 | 12/2020 | Kim et al. | |
| 11,493,552 B2 | 11/2022 | Song et al. | |
| 2020/0327834 A1 * | 10/2020 | Kim ....................... | G09G 3/006 |
| 2022/0328574 A1 * | 10/2022 | Jiang ....................... | H01L 23/60 |

FOREIGN PATENT DOCUMENTS

| | | |
|---|---|---|
| KR | 100534583 B1 | 12/2005 |
| KR | 1020080046603 A | 5/2008 |
| KR | 1020190020882 A | 3/2019 |
| KR | 1020210114577 A | 9/2021 |

* cited by examiner

*Primary Examiner* — Sardis F Azongha

(74) *Attorney, Agent, or Firm* — CANTOR COLBURN LLP

(57) ABSTRACT

A display apparatus includes: a display panel including a display area and a peripheral area adjacent to the display area, where the display panel includes a plurality of gate lines and a plurality of data lines; a scan driver arranged in the peripheral area, connected to the plurality of gate lines, and configured to driven by a first driving voltage and a second driving voltage less than the first driving voltage; a module crack detector arranged in the peripheral area and connected to the plurality of data lines; a short circuit detector arranged in the peripheral area and connected to the plurality of data lines; and an electrostatic blocking portion arranged in the peripheral area, connected to the plurality of data lines, and including a voltage transfer line to which an intermediate voltage less than the first driving voltage and greater than the second driving voltage is applied.

20 Claims, 8 Drawing Sheets

DISPLAY APPARATUS

This application claims priority to Korean Patent Application No. 10-2023-0121270, filed on Sep. 12, 2023, and all the benefits accruing therefrom under 35 U.S.C. § 119, the content of which in its entirety is herein incorporated by reference.

BACKGROUND

1. Field

One or more embodiments relate to a display apparatus, and more particularly, to a display apparatus in which circuit damage caused by an electrostatic discharge ("ESD") may be prevented and a smaller bezel may be implemented, and a method of manufacturing the display apparatus.

2. Description of the Related Art

A display apparatus receives information regarding images and displays images. A display apparatus is used as a display of miniaturized products such as mobile phones or as a display of large-scale products such as televisions.

A display apparatus includes a plurality of pixels that receive electrical signals and emit light to display images to outside. Each pixel includes a light-emitting element. As an example, an organic light-emitting display apparatus includes an organic light-emitting diode ("OLED") as a light-emitting element. Generally, an organic light-emitting display apparatus includes a thin-film transistor and an organic light-emitting diode over a substrate, and operates while the organic light-emitting diode emits light spontaneously.

A display apparatus may be damaged by static electricity occurring during a manufacturing process. Accordingly, a display apparatus in which a damage caused by static electricity occurring during the manufacturing process may be prevented and simultaneously having a smaller bezel may be implemented, is desirable.

SUMMARY

One or more embodiments include a display apparatus in which circuit damage caused by an electrostatic discharge (ESD) may be prevented and a smaller bezel may be implemented, and a method of manufacturing the display apparatus. However, such a technical problem is just an example, and the disclosure is not limited thereto.

Additional aspects will be set forth in part in the description which follows and, in part, will be apparent from the description, or may be learned by practice of the presented embodiments of the disclosure.

According to one or more embodiments, a display apparatus includes: a display panel including a display area and a peripheral area adjacent to the display area, where the display panel includes a plurality of gate lines and a plurality of data lines; a scan driver arranged in the peripheral area, connected to the plurality of gate lines, and configured to driven by a first driving voltage and a second driving voltage less than the first driving voltage; a module crack detector arranged in the peripheral area and connected to the plurality of data lines; a short circuit detector arranged in the peripheral area and connected to the plurality of data lines; and an electrostatic blocking portion arranged in the peripheral area, connected to the plurality of data lines, and including a voltage transfer line to which an intermediate voltage less than the first driving voltage and greater than the second driving voltage is applied.

The intermediate voltage applied to the voltage transfer line may be one of a ground power supply voltage, a reference voltage, and an initialization voltage.

The display apparatus may further include a first driving voltage supply line to which the first driving voltage is applied, and the first driving voltage supply line may be connected to the module crack detector.

The display panel may include a first data line configured to transfer a first data signal to a first pixel line, and a second data line configured to transfer a second data signal to a second pixel line, and the first data line and the second data line may be included in the plurality of data lines.

The module crack detector may include a 1-1 conductive line electrically connected to the first driving voltage supply line, and a 1-1 transistor portion electrically connecting the first data line to the 1-1 conductive line.

The module crack detector may further include a 1-2 transistor portion electrically connecting the second data line to the 1-1 conductive line.

The 1-1 conductive line may be configured to transfer a first static charge introduced from outside to a ground line.

The first static charge may be a positive charge.

The short circuit detector may include a 2-1 conductive line electrically connected to the first driving voltage supply line, and a 2-1 transistor portion connecting the first data line to the 2-1 conductive line.

The short circuit detector may further include: a 2-2 conductive line electrically connected to the first driving voltage supply line, and a 2-2 transistor portion connecting a third data line to the 2-2 conductive line, and the third data line may be included in the plurality of data lines and configured to transfer a third data signal to a third pixel line.

The short circuit detector may further include a 2-3 conductive line connected to a gate of the 2-1 transistor portion and a gate of the 2-2 transistor portion.

The voltage transfer line may be electrically connected to a power line to which the intermediate voltage is applied.

The intermediate voltage may be one of a ground power supply voltage, a reference voltage, and an initialization voltage.

The intermediate voltage may be a ground power supply voltage, and the voltage transfer line may be connected to a power ground line to which the ground power supply voltage is applied.

The electrostatic blocking portion may further include a 3-1 transistor portion connecting the second data line to the voltage transfer line.

The electrostatic blocking portion may further include a 3-2 transistor portion connecting the first data line to the voltage transfer line.

The voltage transfer line may be configured to transfer a second static charge introduced from outside to the power ground line.

The second static charge may be a negative charge.

In a plan view, a width of the power ground line may be greater than a width of the first driving voltage supply line.

The display apparatus may further include a data driver arranged in the peripheral area, the module crack detector may be arranged between the display area and the short circuit detector in a plan view, the short circuit detector may be arranged between the module crack detector and the electrostatic blocking portion in a plan view, and the electrostatic blocking portion may be arranged between the short circuit detector and the data driver.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
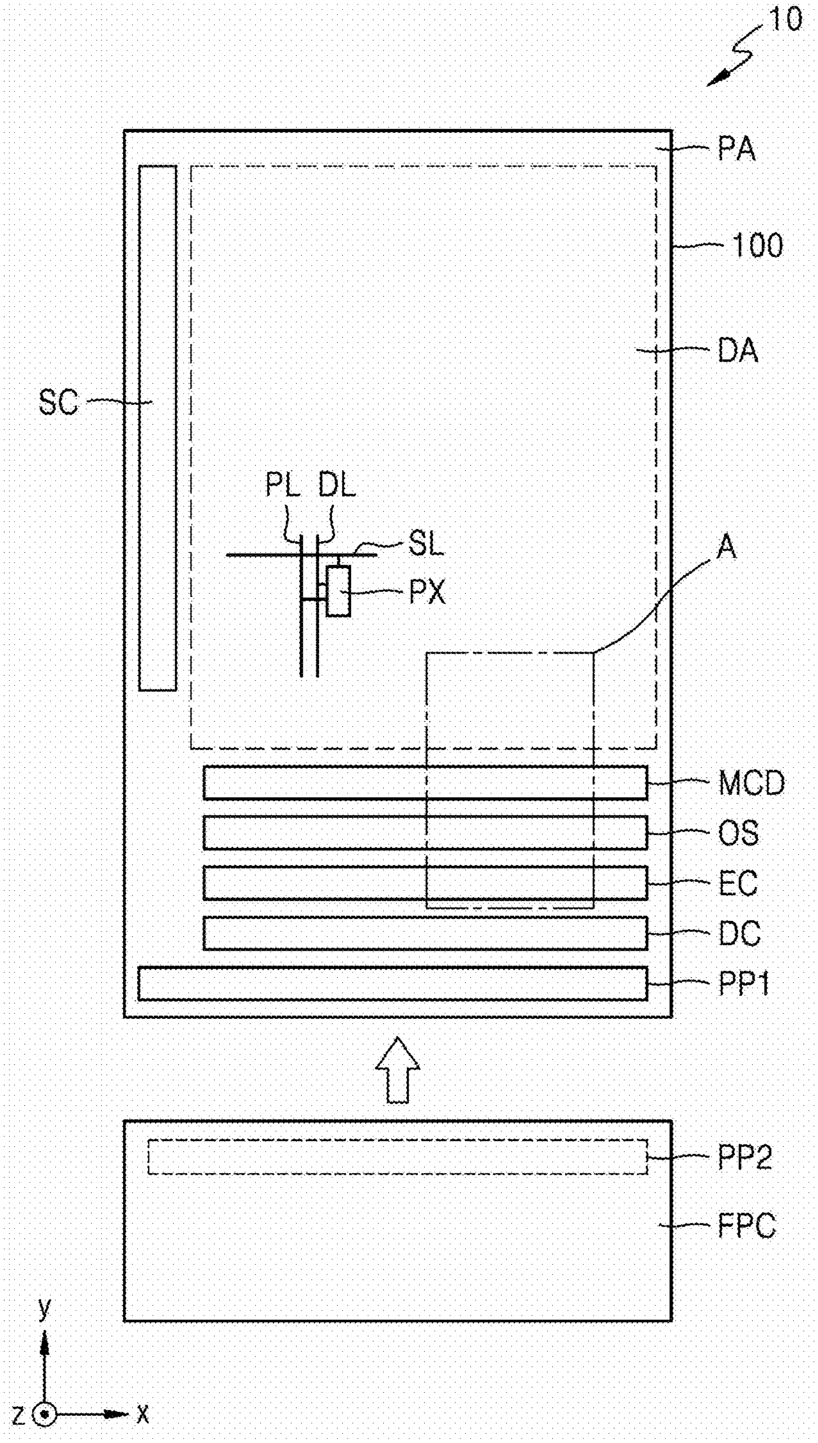
FIG. 1 is a schematic plan view of a display panel of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described with reference to the accompanying drawings, wherein like reference numerals refer to like elements throughout and a repeated description thereof is omitted.

As used herein, when various elements such as a layer, a region, a plate, and the like are disposed "on" another element, not only the elements may be disposed "directly on" the other element, but another element may be disposed therebetween. In addition, sizes of elements in the drawings may be exaggerated or reduced for convenience of explanation. As an example, the size and thickness of each element shown in the drawings are arbitrarily represented for convenience of description, and thus, the disclosure is not necessarily limited thereto.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different orientations that are not perpendicular to one another.

Hereinafter, a display apparatus according to an embodiment is described below in detail based on the above contents.

As the disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described with reference to the accompanying drawings, wherein like reference numerals refer to like elements throughout and a repeated description thereof is omitted.

While such terms as "first" and "second" may be used to describe various elements, such elements must not be limited to the above terms. The above terms are used to distinguish one element from another. In addition, the singular forms "a," "an," and "the" as used herein are intended to include the plural forms as well unless the context clearly indicates otherwise.

In addition, sizes of elements in the drawings may be exaggerated or reduced for convenience of explanation. As an example, the size and thickness of each element shown in the drawings are arbitrarily represented for convenience of description, and thus, the disclosure is not necessarily limited thereto.

It will be understood that the terms "comprise," "comprising," "include" and/or "including" as used herein specify the presence of stated features or elements but do not preclude the addition of one or more other features or elements.

In the case where a certain embodiment may be implemented differently, a specific process order may be performed in the order different from the described order. As an example, two processes successively described may be simultaneously performed substantially and performed in the opposite order.

It will be understood that when a layer, region, or element is referred to as being "connected" to another layer, region, or element, it may be "directly connected" to the other layer, region, or element or may be "indirectly connected" to the other layer, region, or element with another layer, region, or element located therebetween. For example, it will be understood that when a layer, region, or element is referred to as being "electrically connected" to another layer, region, or element, it may be "directly electrically connected" to the other layer, region, or element or may be "indirectly electrically connected" to the other layer, region, or element with another layer, region, or element interposed therebetween.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different orientations that are not perpendicular to one another.

Hereinafter, a display apparatus according to an embodiment is described below in detail based on the above contents.

FIG. 1 is a schematic plan view of a display panel of a display apparatus according to an embodiment.

For convenience, FIG. 1 is described below with reference to other drawings. Also, a schematic description of FIG. 1 is mainly presented.

As shown in FIG. 1, the display apparatus according to an embodiment includes a display panel 10. The display apparatus may be any type of display apparatus as long as the display panel 10 is included. As an example, the display apparatus may include various apparatuses such as smartphones, tablet computers, laptop computers, televisions, advertisement boards, or the like. Because a display apparatus according to an embodiment includes thin-film transistors, a capacitor, and the like, the thin-film transistors, the capacitor, and the like may be implemented by conductive layers and insulating layers.

The display panel 10 includes a display area DA and a peripheral area PA outside the display area DA. It is shown in FIG. 1 that the display area DA has a rectangular shape. However, the embodiment is not limited thereto. The display area DA may have various shapes, for example, a circular shape, an elliptical shape, a polygonal shape, or a shape of a specific figure in other embodiments.

The display area DA is a region in which images are displayed, and a plurality of pixels PX may be arranged in the display area DA. Each pixel PX may include a light-emitting element such as an organic light-emitting diode. Each pixel PX may be configured to emit, for example, red, green, or blue light. The pixel PX may be connected to a pixel circuit including a thin-film transistor TFT, a storage capacitor, and the like. The pixel circuit may be connected to a scan line SL, a data line DL, and a driving voltage line PL, where the scan line SL is configured to transfer scan signals, the data line DL crosses the scan line SL and is configured to transfer data signals, and the driving voltage line PL is configured to supply a driving voltage. The scan line SL may extend in an x direction (referred to as a second direction, hereinafter), the data line DL and the driving voltage line PL may extend in a y direction (referred to as a first direction, hereinafter).

The pixel PX may be configured to emit light of a brightness corresponding to an electrical signal from the pixel circuit electrically connected thereto. The display area DA may be configured to display preset images by using light emitted from the pixel PX. For reference, the pixel PX may be defined as an emission area that is configured to emit light having one of red, green, and blue.

The peripheral area PA is a region in which pixels PX are not arranged and may be a region that is configured not to display images. A power supply line for driving the pixel PX and the like may be arranged in the peripheral area PA. In addition, pads may be arranged in the peripheral area PA, and a printed circuit board FPC including a driving circuit and the like, or an integrated circuit element such as a driver integrated circuit ("IC") may be arranged to be electrically connected to the plurality of pads.

A module crack detector MCD may be arranged in the peripheral area PA. The module crack detector MCD may be configured to detects such as cracks and the like occurring in the outermost region or the peripheral area PA of the display panel 10. The module crack detector MCD may be a circuit mounted on a substrate 100 to detect cracks in a module. As an example, the module crack detector MCD may be a circuit including a plurality of transistors to detect defects such as cracks and the like. The plurality of transistors may be connected to a module crack detection line (not shown) arranged in the outermost portion of the display panel 10.

As an example, the module crack detection line (not shown) may be arranged outside other elements described below, be arranged along the outer line of the display panel 10, and be arranged to be adjacent to the outer line. In a plan view, the module crack detector MCD may be arranged between the display area DA and a short circuit detector OS described below.

As an example, the short circuit detector OS may be arranged in the peripheral area PA. Specifically, the short circuit detector OS may be arranged between the module crack detector MCD and an electrostatic blocking portion EC described below in a plan view.

The short circuit detector OS may be a circuit mounted on the substrate 100 to inspect a short circuit of data lines. As an example, the short circuit detector OS may be a circuit including at least one transistor. As an example, the short circuit detector OS may include a plurality of transistors performing a short circuit inspection of the plurality of data lines, which are inspection objects.

The short circuit detector OS may be connected to a data line to be inspected among the data lines. The short circuit detector OS may be configured to detect a short circuit of a data line to be inspected based on a short circuit inspection signal. Here, when the data line to be inspected is determined to be short-circuited, the short circuit detector OS may be configured to float the data line to be inspected and block the electrical connection between the data line to be inspected and the corresponding pixels PX.

The data line to be inspected means a data line to which the short circuit detector OS is connected among the data lines. As an example, when the short circuit detector OS is connected to each of all the data lines, all the data lines may correspond to the data lines to be inspected.

However, this is just an example, and data lines to be inspected may correspond to only some of the data lines. As an example, data lines to be inspected may correspond to data lines arranged at preset intervals.

As an example, in a plan view, the short circuit detector OS may be arranged between the module crack detector MCD and the electrostatic blocking portion EC described below.

The electrostatic blocking portion EC may be arranged in the peripheral area PA. That is, the display panel 10 may further include the electrostatic blocking portion EC. The electrostatic blocking portion EC may include an electrostatic discharge (ESD) protection circuit configured to protect an internal circuit from a damage caused by a high-voltage pulse. The ESD protection circuit may prevent static charges from flowing into the internal circuit and send the static charges to the ground.

As an example, in a plan view, the electrostatic blocking portion EC may be arranged between the short circuit detector OS and a data driver DC.

As an example, the data driver DC may be arranged in the peripheral area PA. The data driver DC may be mounted on the display panel 10 using a chip-on-glass ("COG") method, a chip-on-film ("COF") method, a chip-on-plastic ("COP") method, or the like. The data driver DC may be configured to generate electrical signals in response to power and signals transferred from the outside, and provide the same to pixels PX arranged in the display area DA.

In addition, a first pad portion PP1 may be arranged in the peripheral area PA, where the first pad portion PP1 is electrically connected to the data driver DC through a wiring or a conductive layer. A printed circuit board FPC may be attached to the first pad portion PP1 in the peripheral area PA.

As an example, the printed circuit board FPC may be electrically connected to the data driver DC through the first pad portion PP1. For this purpose, the printed circuit board FPC may include a second pad portion PP2 corresponding to the first pad portion PP1. As an example, the printed circuit board FPC or the second pad portion PP2 may be attached to the first pad portion PP1 by an adhesive member. As an example, the adhesive member may be an anisotropic conductive film ("ACF").

The printed circuit board FPC may be a flexible printed circuit board ("FPCB") to which a flexible characteristic is given. The FPCB may be folded or warped. The FPCB may be folded below the backside of the display panel 10 to overlap at least a partial region of the display panel 10.

As shown in FIG. 1, a scan driver SC may be arranged in the peripheral area PA of the display panel 10. Although it is shown for convenience of description that the scan driver SC is arranged in one region of the display area DA, this is only one example, and the position and the number of the scan drivers SC are not limited to those shown in FIG. 1.

The scan driver SC may be arranged in the peripheral area PA of the display panel 10. The scan driver SC may be electrically connected to a plurality of gate lines. The scan driver SC may be configured to transfer a control signal to each of the pixels through the plurality of gate lines, where the control signal may turn on or turn off a transistor included in each of the pixels.

The scan driver SC may receive power from a power supply portion (not shown) and be configured to generate and supply a gate signal or a scan signal to each of the gate lines. As an example, the scan driver SC may receive a first driving voltage VGH and a second driving voltage VGL from the power supply portion (not shown). The first driving voltage VGH may be a gate high-level voltage, and the second driving voltage VGL may be a gate low-level voltage.

In one embodiment, the magnitude of the first driving voltage VGH may be greater than the magnitude of the second driving voltage VGL. As an example, a gate high-level voltage may be configured to turn on gates of transistors connected to the gate lines, respectively, and a gate low-level voltage may be configured to turn off gates of transistors connected to the gate lines, respectively.

In one embodiment, the gate high level voltage may be configured to turn off the gates of transistors connected to each of the gate lines, respectively, and the gate low level voltage may be configured to turn on the gates of transistors connected to each of the gate lines, respectively.

Although it is shown in FIG. 1 that the lengths in a ±x direction of the module crack detector MCD, the data driver DC, the short circuit detector OS, and the electrostatic blocking portion EC are equal to each other, the lengths may be different from each other. Furthermore, the lengths in the ±x direction of the data driver DC, the short circuit detector OS, and the electrostatic blocking portion EC may be less or greater than the length in the ±x direction of the display area DA. However, various modifications may be made.

The scan driver SC and the data driver DC may be directly disposed on the substrate 100. As an example, the data driver DC may be directly disposed on the substrate 100 using a chip-on-glass (COG) or chip-on-plastic (COP) method. Alternatively, the data driver DC may be disposed on the printed circuit board FPC electrically connected to the first pad portion PP1 arranged on one side of the substrate 100.

For reference, because the display panel 10 includes the substrate 100, it may be understood that the substrate 100 includes the display area DA and the peripheral area PA. The substrate 100 is described below in detail.

In addition, a plurality of transistors may be arranged in the display area DA. In the plurality of transistors, a first terminal of a transistor may be a source electrode or a drain electrode, and a second terminal may be an electrode different from the first terminal depending on the kind (an N type or a P type) of the transistor and/or an operation condition. As an example, in the case where the first terminal is a source electrode, the second terminal may be a drain electrode.

The plurality of transistors may include a driving transistor, a data-write transistor, a compensation transistor, an initialization transistor, and an emission control transistor. The driving transistor may be connected between the driving voltage line PL and an organic light-emitting diode OLED, and the data-write transistor may be connected to the data line DL and the driving transistor and configured to perform a switching operation of transferring a data signal transferred through the data line DL.

The compensation transistor may be turned on according to a scan signal transferred through the scan line SL and configured to compensate for a threshold voltage of the driving transistor by connecting the driving transistor to the organic light-emitting diode OLED. In this case, a voltage that serves as a reference for the compensation may be a reference voltage.

The initialization transistor may be turned on according to a scan signal transferred through the scan line SL and configured to initialize a gate electrode of the driving transistor by transferring an initialization voltage to the gate electrode of the driving transistor. The initialization voltage may be a voltage configured to initialize the gate electrode of the driving transistor. A scan line connected to the initialization transistor may be a separate scan line different from a scan line connected to the compensation transistor.

The emission control transistor may be turned on according to an emission control signal transferred through an emission control line, and as a result, a driving current may flow through the organic light-emitting diode OLED.

Figure 2:
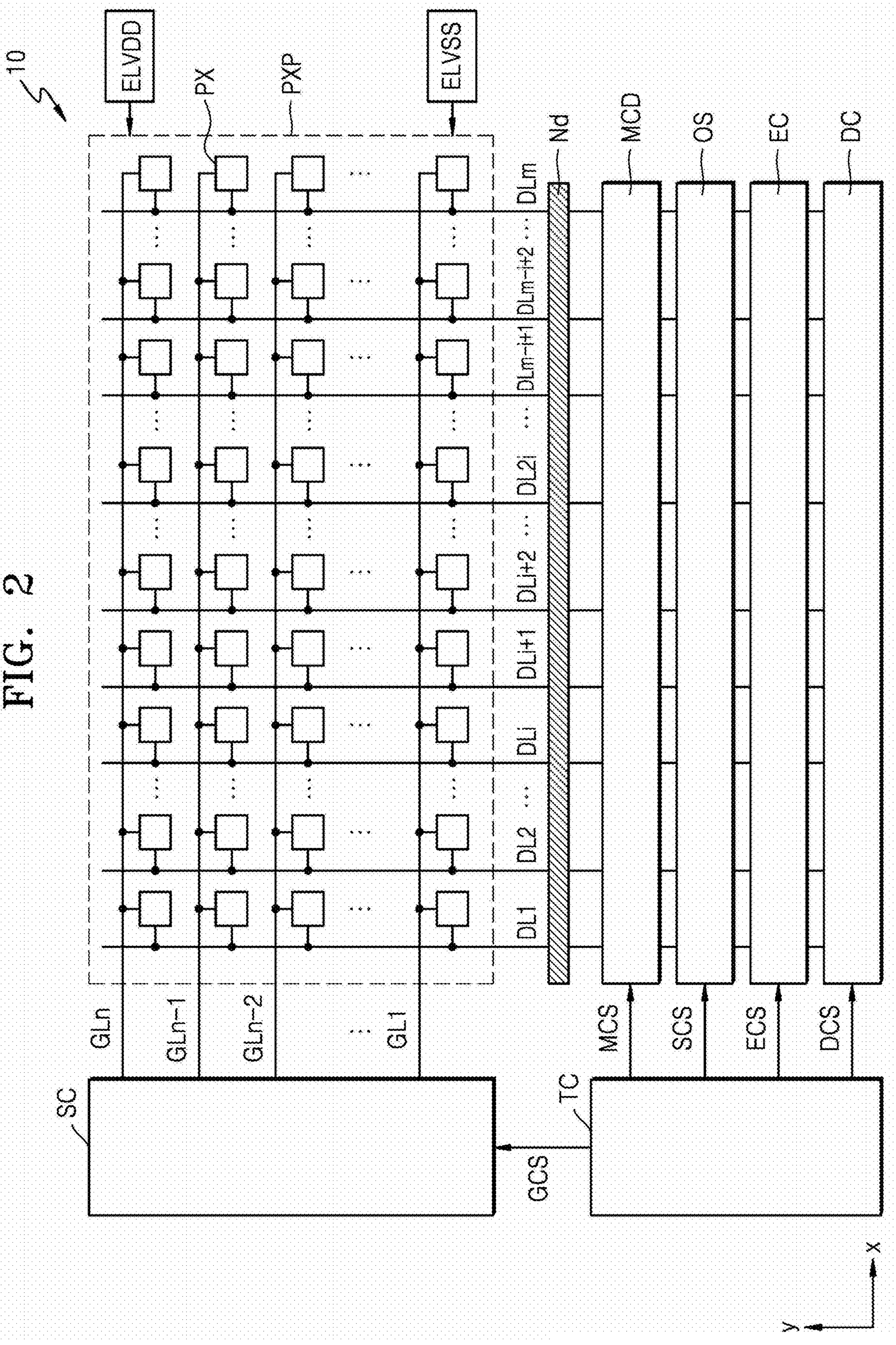
FIG. 2 is a schematic conceptual view of a wiring configuration of a display apparatus according to an embodiment.
Figure 3:
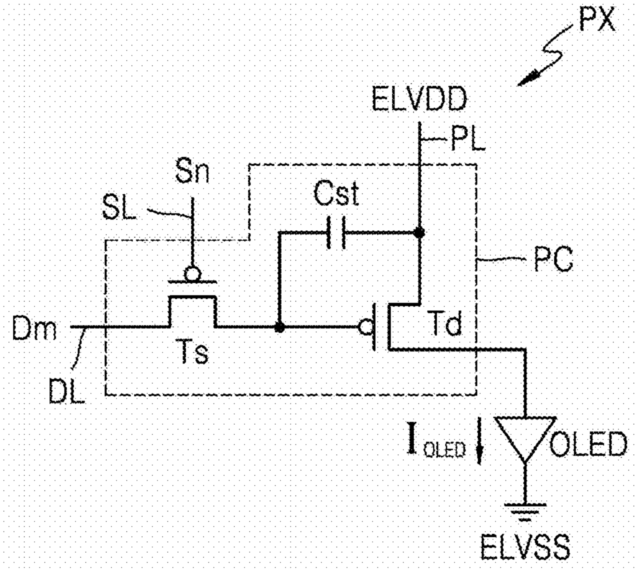
FIG. 3 is an equivalent circuit diagram of a pixel included in the display panel of FIG. 1.

The organic light-emitting diode OLED may include an anode and a cathode, and the cathode may receive a second power voltage (see ELVSS in FIGS. 2 and 3). The organic light-emitting diode OLED may be configured to display images by receiving the driving current from the driving transistor and emitting light.

As an example, the second power voltage ELVSS may be a ground power supply voltage. Accordingly, a wiring configured to transfer the second power voltage ELVSS may be electrically connected to a power ground line (see EVL in FIGS. 5 to 8). As described below, static charges generated and introduced by static electricity may be discharged to the outside through the power ground line (see EVL in FIGS. 5 to 8).

Hereinafter, although an organic light-emitting display apparatus is described as an example of the display apparatus according to an embodiment, the display apparatus is not limited thereto. In another embodiment, the display apparatus according to an embodiment may be an inorganic light-emitting display apparatus or a quantum-dot light-emitting display apparatus. As an example, an emission layer of a display element of the display apparatus may include an organic material or an inorganic material. In addition, the display apparatus may include the emission layer and quantum dots arranged on the path of light emitted from the emission layer.

FIG. 2 is a schematic conceptual view of wiring configuration of a display apparatus according to an embodiment.

For reference, in the description of FIG. 2, contents identical to or repeating those described with reference to FIG. 1 may be omitted.

As shown in FIG. 2, a pixel portion PXP in which the plurality of pixels PX are arranged may be provided in the display area DA. The module crack detector MCD, the short circuit detector OS, the electrostatic blocking portion EC, the data driver DC, the scan driver SC, and a controller TC may be arranged in the peripheral area PA.

Each of the plurality of pixels PX may be connected to a corresponding gate line among a plurality of gate lines GL1 to GLn, and to a corresponding data line among a plurality of data lines DL1 to DLm. Each of the plurality of gate lines GL1 to GLn may extend in a first direction (e.g., an x direction, a row direction) and be connected to pixels PX arranged in the same row. Each of the plurality of gate lines GL1 to GLn may be configured to transfer a gate signal to pixels PX in the same row. Each of the plurality of data lines DL1 to DLm may extend in a second direction (e.g., a y direction, a column direction) and be connected to pixels PX in the same column.

The scan driver SC may be connected to the plurality of gate lines GL1 to GLn and configured to generate gate signals according to a gate driving control signal GCS from the controller TC, and sequentially supply the gate signals to the gate lines GL1 to GLn. When gate signals are sequentially supplied to the gate lines GL1 to GLn, pixels PX may be selected on a row basis. The data lines DL1 to DLm may be configured to transfer data signals to pixels PX in a selected row, respectively. The gate line may be connected to a gate of a transistor included in the pixel PX. A gate signal may be a gate control signal configured to control a turn-on and a turn-off of a transistor connected to a gate line. A gate signal may be a square wave in which an on-voltage by which a transistor may be turned on, and an off-voltage by which a transistor may be turned off are repeated.

The data driver DC may be connected to the data lines DL1 to DLm, and the data driver DC may be configured to convert an image signal into a data signal of a voltage or current form according to a data driving control signal DCS input from the controller TC. The data driver DC may be configured to supply data signals to the pixels PX through the data lines DL1 to DLm.

The data driver DC may be disposed on the flexible printed circuit board (FPCB) electrically connected to the pad arranged on one side of the substrate 100. In another embodiment, the data driver DC may be directly disposed on the substrate 100 using a chip-on-glass (COG) or chip-on-plastic (COP) method.

As an example, in the case where the display apparatus is an organic light-emitting display apparatus, a first power voltage ELVDD and the second power voltage ELVSS may be supplied to the pixels PX. The first power voltage ELVDD may be a high-level voltage provided to a first electrode (a pixel electrode or an anode electrode) included in each pixel PX. The second power voltage ELVSS may be a low-level voltage provided to a second electrode (an opposite electrode or a cathode electrode) of a display element included in each pixel PX. As an example, the second power voltage ELVSS may be a ground power supply voltage. A difference between the first power voltage ELVDD and the second power voltage ELVSS may be a driving voltage configured to allow the plurality of pixels PX to emit light.

As shown in FIG. 2, the controller TC may be configured to control the scan driver SC, the module crack detector MCD, the short circuit detector OS, the electrostatic blocking portion EC, and the data driver DC. Specifically, the controller TC may be a timing controller configured to control operation timings of transistors included in the scan driver SC, the module crack detector MCD, the short circuit detector OS, the electrostatic blocking portion EC, and the data driver DC.

For this purpose, the controller TC may be configured to generate and provide a start signal, a driving signal, and the like suitable for each of the scan driver SC, the module crack detector MCD, the short circuit detector OS, the electrostatic blocking portion EC, and the data driver DC based on a control signal supplied from the outside (or an external apparatus).

As an example, the controller TC may be configured to supply a scan driving signal GCS to the scan driver SC and control the operation of the scan driver SC. The scan driver SC may be configured to generate and provide gate signals or scan signals to the plurality of gate lines based on a scan driving signal GCS.

As an example, the controller TC may be configured to control the operation of the module crack detector MCD by supplying a crack detection control signal MCS to the module crack detector MCD. As an example, the controller TC may be configured to control the operation of the short circuit detector OS by supplying a short circuit detection control signal MCS to the short circuit detector OS. The controller TC may be configured to control the operation of the electrostatic blocking portion EC by supplying a static charge discharge control signal ECS to the electrostatic blocking portion EC.

The controller TC may be configured to convert image data supplied from the outside to meet specifications of the data driver DC and supply the same to the data driver DC. In addition, the controller TC may be configured to control the operation of the data driver DC by generating a data driving control signal DCS using a control signal supplied from the outside, and suppling the same to the data driver DC.

The data lines DL1 to DLm may be connected to a node portion Nd and connected to the module crack detector MCD, the short circuit detector OS, the electrostatic blocking portion EC, and the data driver DC through the node portion Nd.

FIG. 3 is an equivalent circuit diagram of a pixel included in the display panel of FIG. 1.

For reference, in the description of FIG. 3, contents identical to or repeating those described with reference to FIG. 1 may be omitted.

As shown in FIG. 3, each pixel PX may include a pixel circuit PC and the organic light-emitting diode OLED connected to the pixel circuit PC, where the pixel circuit PC is connected to the scan line SL and the data line DL.

The pixel circuit PC includes a driving thin-film transistor Td, a switching thin-film transistor Ts, and a storage capacitor Cst. The switching thin-film transistor Ts is connected to the scan line SL and the data line DL, and configured to transfer a data signal Dm to the driving thin-film transistor Td according to a scan signal Sn, where the data signal Dm is input through the data line DL, and the scan signal Sn is input through the scan line SL.

The storage capacitor Cst may be connected to the switching thin-film transistor Ts and the driving voltage line PL and configured to store a voltage corresponding to a difference between a voltage transferred from the switching thin-film transistor Ts and the first power voltage ELVDD supplied to the driving voltage line PL.

The second power voltage ELVSS may be a pixel driving voltage having a relatively low level compared to the first power voltage ELVDD. The level of the pixel driving voltage supplied to each pixel PX may be a difference between the levels of the first power voltage ELVDD and the second power voltage ELVSS.

The driving thin-film transistor Td may be connected to the driving voltage line PL and the storage capacitor Cst and configured to control a driving current according to the voltage stored in the storage capacitor Cst, the driving current flowing from the driving voltage line PL to the organic light-emitting diode OLED. The organic light-emitting diode OLED may be configured to emit light having a preset brightness corresponding to the driving current.

Although it is described with reference to FIG. 3 that the pixel circuit PC includes two thin-film transistors and one storage capacitor, the embodiment is not limited thereto.

Figure 4:
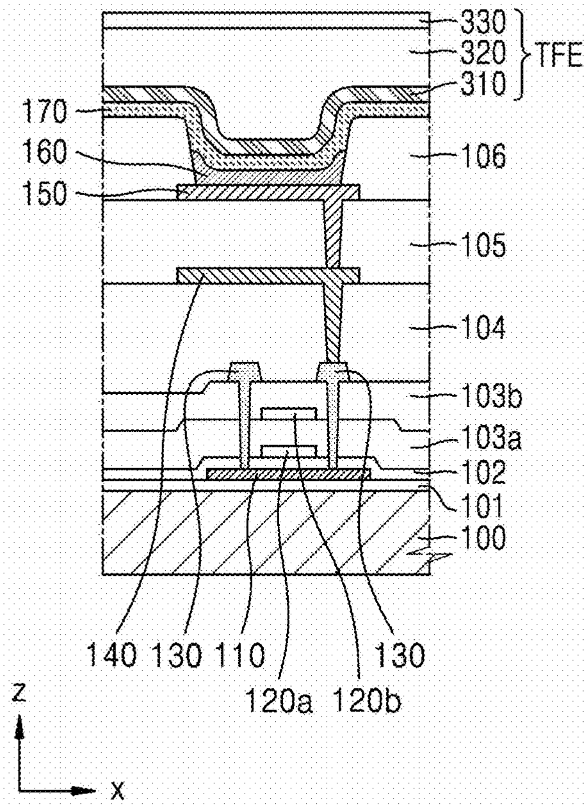
FIG. 4 is a schematic cross-sectional view of a pixel PX of the display panel of FIG. 1.

FIG. 4 is a schematic cross-sectional view of a pixel PX of the display panel of FIG. 1.

For reference, in the description of FIG. 4, contents identical to or repeating those described with reference to FIGS. 1 and 3 may be omitted.

As described above, the substrate 100 may include the display area DA and regions corresponding to the peripheral area PA outside the display area DA. The substrate 100 may include various flexible or bendable materials. As an example, the substrate 100 may include glass, metal, or a polymer resin. In addition, the substrate 100 may include a polymer resin such as polyethersulphone ("PES"), polyacrylate, polyetherimide, polyethylene naphthalate, polyethylene terephthalate, polyphenylene sulfide, polyarylate, polyimide, polycarbonate, or cellulose acetate propionate. The substrate 100 may have a multi-layered structure including two layers each including the polymer resin, and a barrier layer including an inorganic material (such as silicon oxide, silicon nitride, and silicon oxynitride) therebetween. However, various modifications may be made.

Alternatively, to implement ultra-high resolution, the substrate 100 may include a semiconductor material, such as a Group IV semiconductor, a Group III-V compound semiconductor, or a Group II-VI compound semiconductor. The substrate 100 may include a silicon layer. That is, the substrate 100 may be a semiconductor substrate including a semiconductor material. The substrate 100 may be a substrate including a silicon wafer formed by using a semiconductor process. In this case, an active layer is disposed in the inner portion of the substrate 100 including the silicon wafer, and a gate line, a data line, and a transistor may be disposed on the upper surface of the substrate 100. As described above, an organic light-emitting diode OLED that uses the substrate including the silicon wafer may be referred to as an OLED on silicon ("OLEDoS"). As an example, in the case of an OLEDoS, a complementary metal oxide semiconductor ("CMOS") process is desirable, and an OLED element may be formed on an electrode formed by the CMOS process. To implement each of colors R, G, and B in an OLEDoS, generally, a white OLEDs are made and color filters are placed on the white OLEDs to implement the R, G, and B colors. OLEDoS may be mainly used for extended reality ("XR"), and the like, and may implement ultra-high definition of 8K or more in a small area of about 1 to 2 inches. When a semiconductor substrate is used, precise control of pixels arranged at ultra-high resolution may be performed. However, the embodiment is not limited thereto.

A buffer layer 101 may be disposed on the substrate 100. The buffer layer 101 may prevent impurity ions from diffusing, prevent penetration of moisture or external air, and serve as a barrier layer for planarizing a surface and/or a blocking layer. The buffer layer 101 may include silicon oxide, silicon nitride, or silicon oxynitride. In addition, the buffer layer 101 may allow a semiconductor layer 110 to be uniformly crystalized by adjusting a rate of heat provision during a crystallization process for forming the semiconductor layer 110.

The semiconductor layer 110 may be disposed on the buffer layer 101. The semiconductor layer 110 may include polycrystalline silicon, and include a channel region not doped with impurities, a source region, and a drain region on two opposite sides of the channel region, each doped with impurities. Here, impurities may change depending on the kind of a thin-film transistor and may be N-type impurities or P-type impurities.

A gate insulating layer 102 may be disposed on the semiconductor layer 110. The gate insulating layer 102 may be a construction for securing insulation between the semiconductor layer 110 and a first gate layer 120*a*. The gate insulating layer 102 may include an inorganic material such as silicon oxide, silicon nitride, and/or silicon oxynitride, and may be disposed between the semiconductor layer 110 and the first gate layer 120*a*. In addition, the gate insulating layer 102 may have a shape corresponding to an entire surface of the substrate 100 and have a structure in which contact holes are defined in preset portions. As described above, the insulating layer including the inorganic material may be formed by chemical vapor deposition ("CVD") or atomic layer deposition ("ALD"). This is also applicable to embodiments below and modifications thereof.

The first gate layer 120*a* may be disposed on the gate insulating layer 102. The first gate layer 120*a* may be disposed at a position overlapping the semiconductor layer 110 vertically and may include at least one metal among molybdenum (Mo), aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), and titanium (Ti), tungsten (W), and copper (Cu).

A first interlayer-insulating layer 103*a* may be disposed on the first gate layer 120*a*. The first interlayer-insulating layer 103*a* may cover the first gate layer 120*a*. The first interlayer-insulating layer 103*a* may include an inorganic material. As an example, the first interlayer-insulating layer 103*a* may include metal oxide or metal nitride, and specifically, the inorganic material may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$). In an embodiment, the first interlayer-insulating layer 103*a* may have a double structure of $SiO_x/SiN_y$ or $SiN_x/SiO_y$.

A second gate layer 120*b* may be disposed on the first interlayer-insulating layer 103*a*. The second gate layer 120*b* may be disposed at a position overlapping the first gate layer 120*a* vertically and may include at least one metal among molybdenum (Mo), aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), and titanium (Ti), tungsten (W), and copper (Cu).

Depending on the case, the second gate layer 120*b* may constitute the storage capacitor Cst described with reference to FIG. 2 in cooperation with the first gate layer 120*a*. The first gate layer 120*a* may be one electrode of the storage capacitor Cst, and the second gate layer 120*b* may be the other electrode of the storage capacitor Cst.

A second interlayer-insulating layer 103*b* may be disposed on the second gate layer 120*b*. The second interlayer-insulating layer 103*b* may cover the second gate layer 120*b*. The second interlayer-insulating layer 103*b* may include an inorganic material. As an example, the second interlayer-insulating layer **103*b* may include metal oxide or metal nitride, and specifically, the inorganic material may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$). In an embodiment, the second interlayer-insulating layer 103*b*** may have a double structure of $SiO_x$/$SiN_y$ or $SiN_x$/$SiO_y$.

A first conductive layer 130 may be disposed on the second interlayer-insulating layer **103*b*. The first conductive layer 130 may serve as an electrode connected to a source/drain region of a semiconductor layer through a through hole included in the second interlayer-insulating layer 103*b*. The first conductive layer 130 may include at least one metal among aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and copper (Cu). As an example, the first conductive layer 130** may include a Ti layer, an Al layer, and/or a Cu layer.

A first organic insulating layer 104 may be disposed on the first conductive layer 130. The first organic insulating layer 104 may cover the upper portion of the first conductive layer 130, have an approximately flat upper surface, and may be an organic insulating layer serving as a planarization layer. The first organic insulating layer 104 may include an organic material, such as acryl, benzocyclobutene ("BCB"), or hexamethyldisiloxane ("HMDSO"). The first organic insulating layer 104 may include a single layer or a multi-layer. However, various modifications may be made.

A second conductive layer 140 may be disposed on the first organic insulating layer 104. The second conductive layer 140 may serve as an electrode connected to the source/drain region of the semiconductor layer through a through hole included in the first organic insulating layer 104. The second conductive layer 140 may include at least one metal among aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and copper (Cu). As an example, the second conductive layer 140 may include a Ti layer, an Al layer, and/or a Cu layer.

A second organic insulating layer 105 may be disposed over the first conductive layer 130. The second organic insulating layer 105 may cover the upper portion of the first conductive layer 130, have an approximately flat upper surface, and may be an organic insulating layer serving as a planarization layer. The second organic insulating layer 105 may include an organic material, such as acryl, benzocyclobutene (BCB), or hexamethyldisiloxane (HMDSO). The second organic insulating layer 105 may include a single layer or a multi-layer. However, various modifications may be made.

In addition, although not shown in FIG. 4, an additional conductive layer and an additional insulating layer may be disposed between the conductive layer and a pixel electrode 150, and applicable to various embodiments. In this case, the additional conductive layer may include the same material as the conductive layer and have the same layered structure as the conductive layer. The additional insulating layer may include the same material as the organic insulating layer and have the same layered structure as the organic insulating layer.

The pixel electrode 150 may be disposed on the second organic insulating layer 105. The pixel electrode 150 may be connected to the second conductive layer 140 through a contact hole defined in the second organic insulating layer 105. A display element may be disposed on the pixel electrode 150.

The organic light-emitting diode OLED may be used as the display element. That is, the organic light-emitting diode OLED may be disposed on the pixel electrode 150. The pixel electrode 150 may include a light-transmissive conductive layer and a reflective layer, where the light-transmissive conductive layer includes a light-transmissive conductive oxide such as indium tin oxide ("ITO"), indium oxide ($In_2O_3$), or indium zinc oxide ("IZO"), and the reflective layer includes metal such as aluminum (Al) or silver (Ag). As an example, the pixel electrode 150 may have a three-layered structure of ITO/Ag/ITO.

A pixel-defining layer 106 may be disposed on the second organic insulating layer 105 and arranged to cover the edges of the pixel electrode 150. That is, the pixel-defining layer 106 may cover the edges of the pixel electrode 150. The pixel-defining layer 106 has an opening corresponding to the pixel PX, and the opening may be formed to expose at least the central portion of the pixel electrode 150. The pixel-defining layer 106 may include an organic material such as polyimide or HMDSO, or may include an inorganic material such as a silicon compound (e.g., $SiN_x$, $SiO_x$, and the like).

In addition, a spacer (not shown) may be disposed on the pixel-defining layer 106. Although it is shown that the spacer (not shown) is arranged in the peripheral area PA, the spacer may be arranged in the display area DA. The spacer (not shown) may prevent the organic light-emitting diode OLED from being damaged by sagging of a mask in the manufacturing process that uses the mask. The spacer (not shown) may include an organic insulating material and include a single layer or a multi-layer.

An intermediate layer 160 may be disposed on the pixel electrode 150. As an example, the intermediate layer 160 may be disposed in the opening of the pixel-defining layer 106. As an example, the intermediate layer 160 and an opposite electrode 170 may be disposed in the opening of the pixel-defining layer 106.

The intermediate layer 160 may include a low-molecular weight or polymer material and include a hole injection layer, a hole transport layer, an emission layer, an electron transport layer, and/or an electron injection layer.

The opposite electrode 170 may include a light-transmissive conductive layer including a light-transmissive conductive oxide such as ITO, $In_2O_3$, or IZO. Alternatively, the opposite electrode 170 may be a conductive layer including silver (Ag) and/or magnesium (Mg). The pixel electrode 150 is used as an anode, and the opposite electrode 170 is used as a cathode. The polarities of the electrodes may be reversely applied.

The structure of the intermediate layer 160 is not limited thereto, and the intermediate layer 160 may have various structures. As an example, at least one of layers constituting the intermediate layer 160 may be integrally formed like the opposite electrode 170. Alternatively, the intermediate layer 160 may include a layer patterned to correspond to each of a plurality of pixel electrodes 150.

The opposite electrode 170 may be arranged in the upper portion of the display area DA and arranged over the entire surface of the display area DA. As an example, the opposite electrode 170 may be integrally formed to cover the plurality of pixels. The opposite electrode 170 may be in electrical contact with a power supply line (not shown) arranged in the peripheral area PA. In an embodiment, the opposite electrode 170 may extend to a blocking wall (not shown).

A thin-film encapsulation layer TFE may be disposed on the opposite electrode 170. The thin-film encapsulation layer TFE may cover the display area DA entirely and be arranged to extend the peripheral area PA and cover at least a portion of the peripheral area PA.

The thin-film encapsulation layer TFE may include a first inorganic encapsulation layer 310, a second inorganic encapsulation layer 330, and an organic encapsulation layer 320 therebetween. The first inorganic encapsulation layer 310 and the second inorganic encapsulation layer 330 may include one or more inorganic materials such as aluminum oxide, titanium oxide, tantalum oxide, hafnium oxide, zinc oxide, silicon oxide, silicon nitride, and silicon oxynitride.

The organic encapsulation layer 320 may include a monomer-based material or a polymer-based material. The polymer-based material may include an acryl-based resin, an epoxy-based resin, polyimide, and polyethylene. In an embodiment, the organic encapsulation layer 320 may include acrylate.

The blocking wall (not shown) may be arranged in the peripheral area PA of the substrate 100. In an embodiment, although the blocking wall (not shown) may include a portion of the first organic insulating layer 104, a portion of the second organic insulating layer 105, a portion of the pixel-defining layer 106, and a portion of the spacer (not shown), the embodiment is not limited thereto.

Depending on the case, the blocking wall (not shown) may be arranged to surround the display area DA and configured to prevent the organic encapsulation layer 320 of the thin-film encapsulation layer TFE from overflowing to the outside of the substrate 100.

Figure 5:
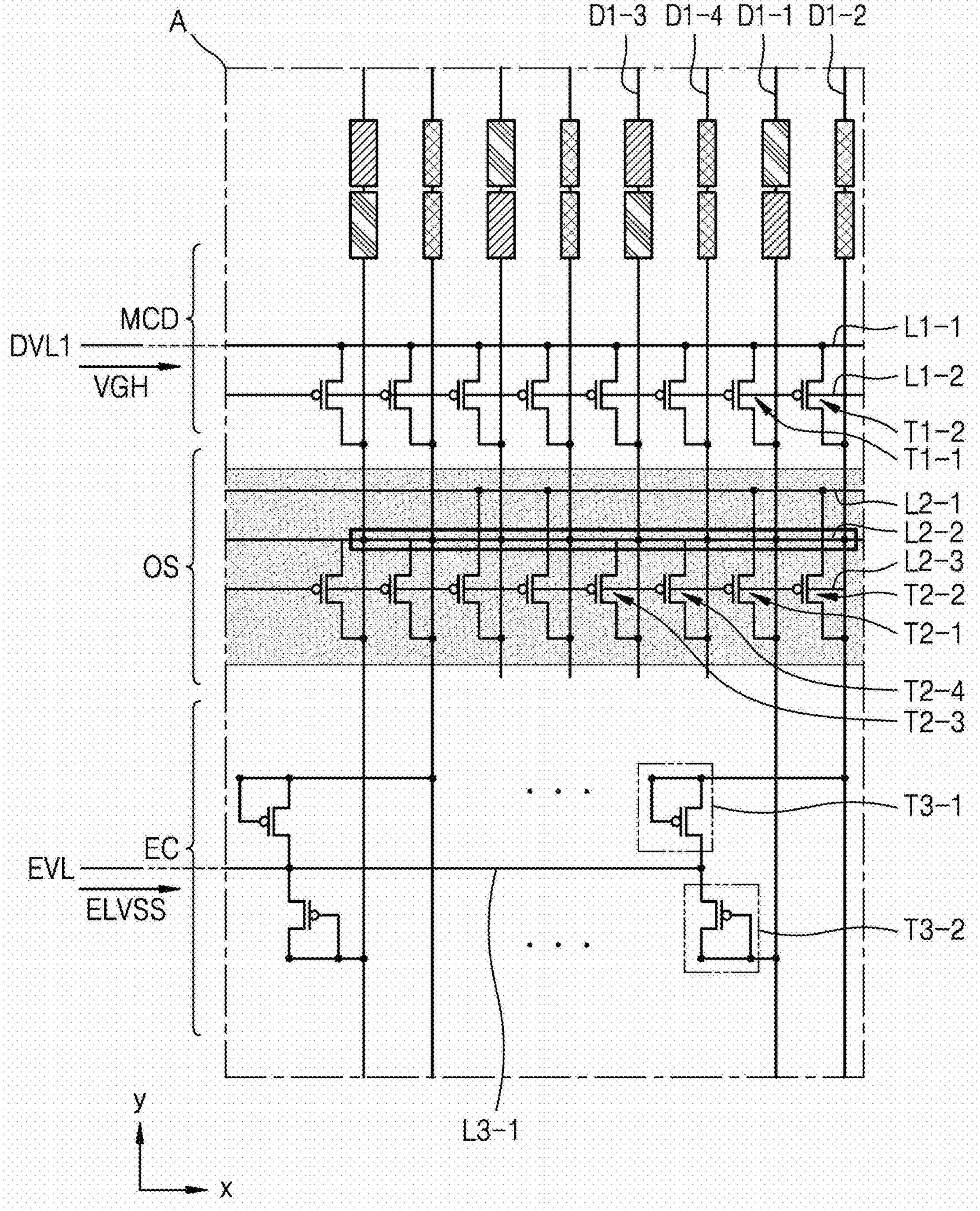
FIGS. 5 to 7 are schematic plan views of a region A of FIG. 1.
Figure 6:
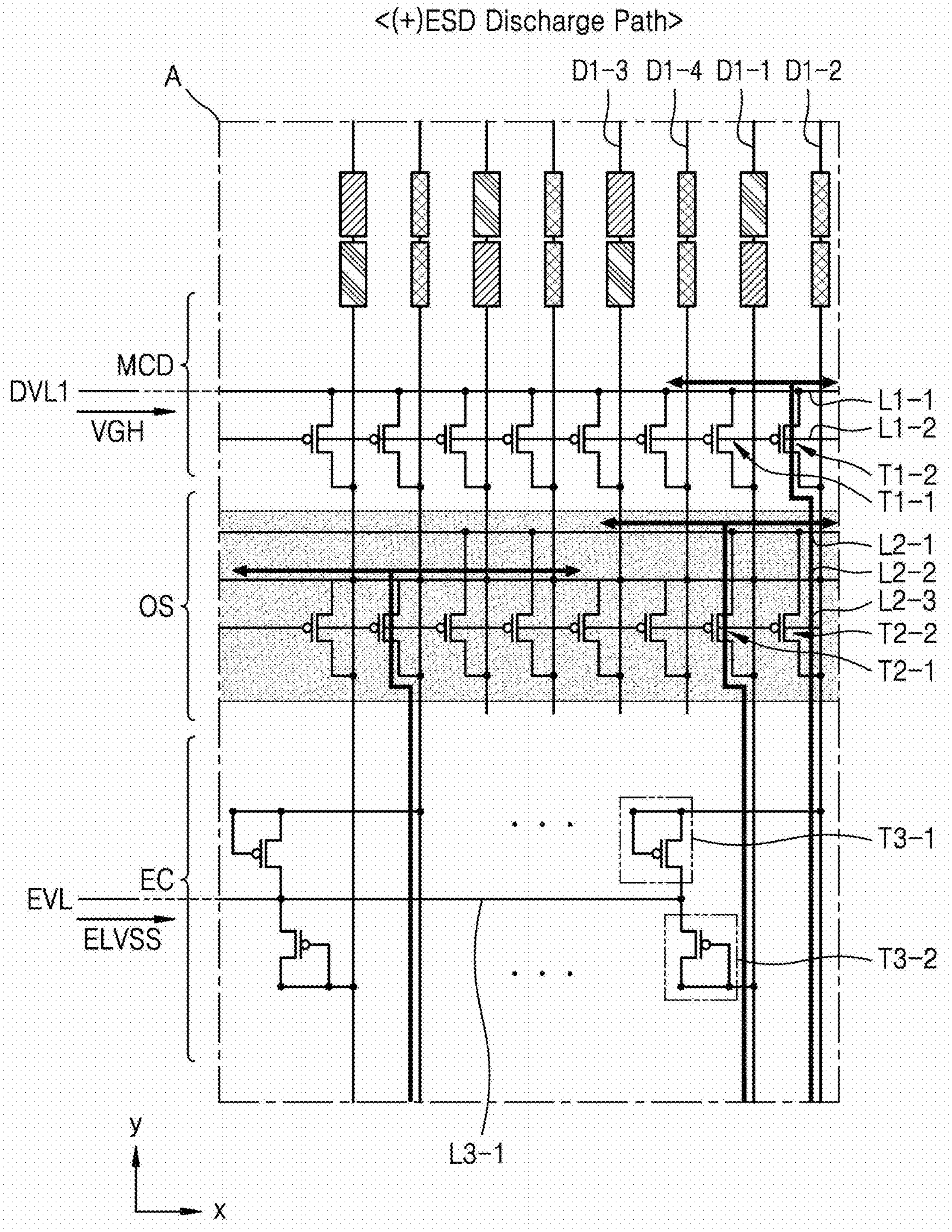
Figure 7:
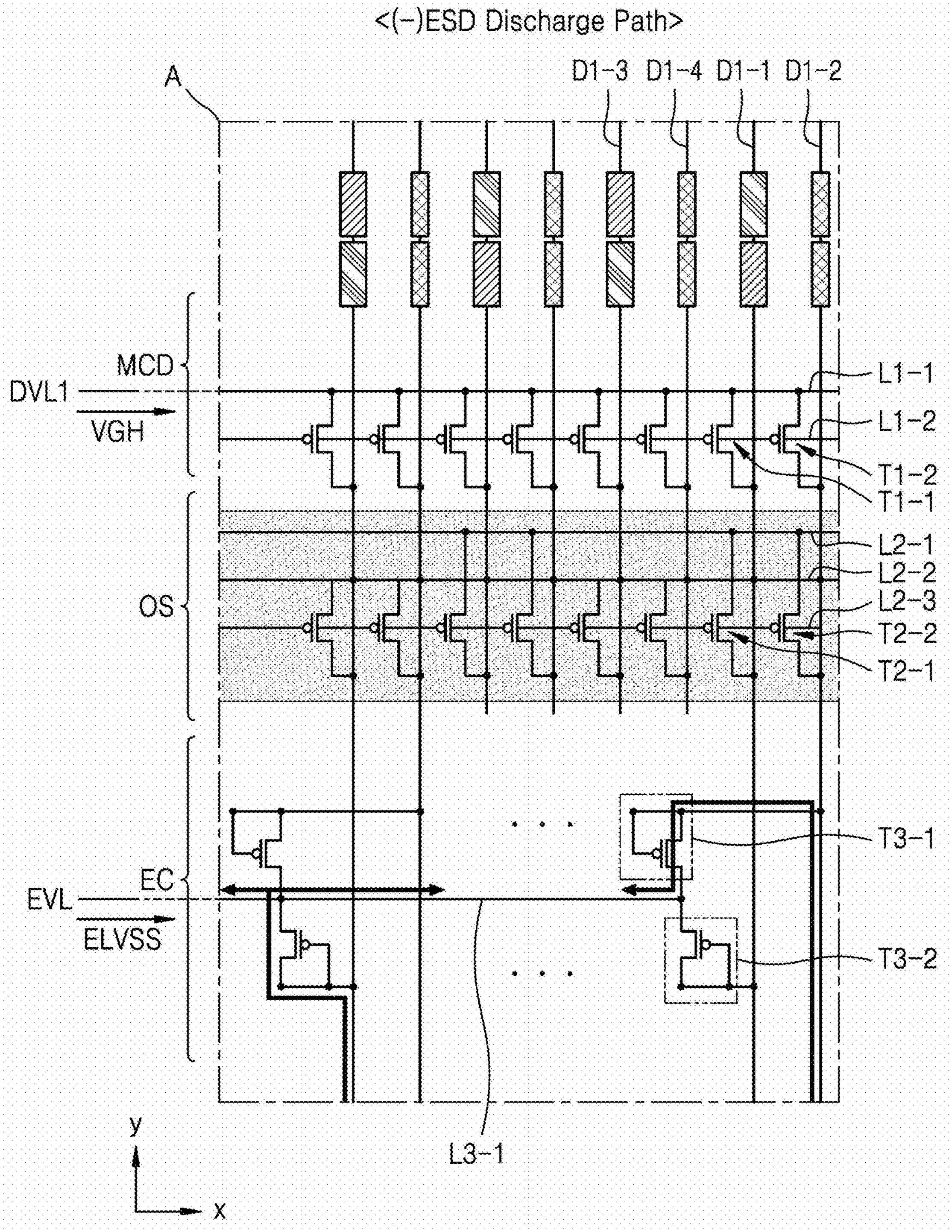

FIGS. 5 to 7 are schematic plan views of a region A of FIG. 1.

For reference, in the description of FIGS. 5 to 7, contents identical to or repeating those described above may be omitted.

As shown in FIG. 5, the display apparatus according to an embodiment may include the display area DA and he peripheral area PA adjacent to the display area DA, and include the display panel 10 including a plurality of signal lines.

The module crack detector MCD, the short circuit detector OS, and the electrostatic blocking portion EC may be arranged in the peripheral area PA of the display panel 10. In addition, the display panel 10 may further include a first data line D1-1, a second data line D1-2, a third data line D1-3, a fourth data line D1-4, and the like each extending in an approximate ±y direction. For convenience of description, contents of an embodiment may be described mainly focusing on the first data line D1-1 and the second data line D1-2.

As an example, the first data line D1-1 may be configured to transfer a first data signal to a first pixel line. As an example, the second data line D1-2 may be configured to transfer a second data signal to a second pixel line. Like this, an n-th data line may be configured to transfer an n-th data signal to an n-th pixel line. The n-th pixel line may denote pixels arranged side-by-side in the ±y direction and configured to receive an n-th data signal from the n-th data line.

As shown in FIG. 5, the module crack detector MCD may include a 1-1 conductive line L1-1 and a 1-2 conductive line L1-2 each extending in an approximate ±x direction. In addition, the module crack detector MCD may include a 1-1 transistor portion T1-1 connecting the first data line D1-1 to the 1-1 conductive line L1-1. The module crack detector MCD may further include a 1-2 transistor portion T1-2 connecting the second data line D1-2 to the 1-1 conductive line L1-1.

The 1-1 transistor portion T1-1 and the 1-2 transistor portion T1-2 may be electrically connected to the 1-2 conductive line L1-2. Each of the 1-1 transistor portion T1-1 and the 1-2 transistor portion T1-2 has a gate, and each gate is electrically connected to the 1-2 conductive line L1-2 and may be configured to operate according to a gate control signal transferred through the 1-2 conductive line L1-2.

As an example, the 1-1 conductive line L1-1 may be electrically connected to a first driving voltage supply line DVL1 to which the gate high-level voltage is applied. As an example, the 1-2 conductive line L1-2 may be electrically connected to the controller TC to control the 1-1 transistor portion T1-1, the 1-2 transistor portion T1-2, and the like. As an example, the display apparatus according to an embodiment may further include the first driving voltage supply line DVL1 to which a gate high-level voltage is applied, and the first driving voltage supply line DVL1 may be electrically connected to the module crack detector MCD. Charges discharged through the 1-1 conductive line L1-1 may be transferred to a ground line connected to the first driving voltage supply line DVL1. In this case, the ground line may be a power ground line, which will be described later, or a line for separate grounding that is separately connected during the manufacturing process.

As an example, the 1-1 conductive line L1-1 and the 1-2 conductive line L1-2 may be electrically connected to each other by a resistive portion (not shown).

For convenience of description, although the 1-1 transistor portion T1-1 and the 1-2 transistor portion T1-2 are mainly described, transistor portions corresponding to data lines, respectively, may be further provided.

The short circuit detector OS may include a 2-1 conductive line L2-1, a 2-2 conductive line L2-2, and a 2-3 conductive line L2-3 extending in the approximate ±x direction, and electrically connected to the first data line D1-1, the second data line D1-2, the third data line D1-3, the fourth data line D1-4, the n-th data line, and the like.

The short circuit detector OS may further include a 2-1 transistor portion T2-1 connecting the first data line D1-1 to the 2-1 conductive line L2-1, and a 2-2 transistor portion T2-2 connecting the second data line D1-2 to the 2-1 conductive line L2-1.

The short circuit detector OS may further include a 2-3 transistor portion T2-3 connecting the third data line D1-3 to the 2-2 conductive line L2-2, and a 2-4 transistor portion T2-4 connecting the fourth data line D1-4 to the 2-2 conductive line L2-2.

The 2-1 transistor portion T2-1 to the 2-4 transistor portion T2-4 may be electrically connected to the 2-3 conductive line L2-3. As an example, a gate of each of the 2-1 transistor portion T2-1 to the 2-4 transistor portion T2-4 may be electrically connected to the 2-3 conductive line L2-3. The 2-3 conductive line L2-3 may be configured to receive a control signal for controlling a gate of each of the 2-1 transistor portion T2-1 to the 2-4 transistor portion T2-4 from the controller TC.

As an example, the 2-1 conductive line L2-1 and the 2-3 conductive line L2-3 may be electrically connected to each other by a resistive member (not shown). As an example, the 2-2 conductive line L2-2 and the 2-3 conductive line L2-3 may be electrically connected to each other by another resistive member (not shown).

As an example, at least one of the 2-1 conductive line L2-1 and the 2-2 conducive line L2-2 may be electrically connected to the first driving voltage supply line DVL1 to which the gate high-level voltage is applied.

For convenience of description, although the 2-1 transistor portion T2-1 to the 2-4 transistor portion T2-4 are mainly described, transistor portions corresponding to data lines, respectively, may be further provided.

The electrostatic blocking portion EC may be arranged in the peripheral area PA. The electrostatic blocking portion EC may be connected to the plurality of data lines. A voltage less than the first driving voltage VGH and greater than the second driving voltage VGL may be applied to the electrostatic blocking portion EC. The voltage less than the first driving voltage VGH and greater than the second driving voltage VGL may be defined as an "intermediate voltage". As an example, the intermediate voltage may be one of the ground power supply voltage, the reference voltage, and the initialization voltage. Alternatively, even though it is a voltage other than the ground power supply voltage (or the above-described second power supply voltage ELVSS), the reference voltage, and the initialization voltage Vint, when it is a voltage less than the first driving voltage VGH and greater than the second driving voltage VGL, the voltage may be referred to as the intermediate voltage. Preferably, the intermediate voltage may be the ground power supply voltage. A power ground line EVL configured to transfer the intermediate voltage or the ground power supply voltage (or the above-described second power voltage ELVSS) may be a wiring having the widest width among wirings used in the display panel 10 or having a relatively wider width than other wirings (e.g., first driving voltage supply line) used in the display panel 10 in a plan view. Accordingly, it is preferable to discharge static charges using the power ground line EVL configured to transfer the ground power supply voltage (or the above-described second power voltage ELVSS). As an example, the power ground line EVL is a wiring included in an element configured to supply power and may be a wiring serving as a ground within an element that supplies power.

As shown in FIG. 5, the electrostatic blocking portion EC may include a voltage transfer line L3-1 extending in the approximate ±x direction. As an example, the electrostatic blocking portion EC may include a 3-1 transistor portion T3-1 electrically connecting the voltage transfer line L3-1 to the second data line D1-2. The electrostatic blocking portion EC may include a 3-2 transistor portion T3-2 electrically connecting the voltage transfer line L3-1 to the first data line D1-1.

Each of the 3-1 transistor portion T3-1 and the 3-2 transistor portion T3-2 may include a gate. The gate of the 3-1 transistor portion T3-1 may be electrically connected to the second data line D1-2. A source of the 3-1 transistor portion T3-1 may be electrically connected to the second data line D1-2 and electrically connected to the gate of the 3-1 transistor portion T3-1. The gate of the 3-2 transistor portion T3-2 may be electrically connected to the first data line D1-1. A source of the 3-2 transistor portion T3-2 may be electrically connected to the first data line D1-1 and electrically connected to the gate of the 3-2 transistor portion T3-2.

As a result, each of the 3-1 transistor portion T3-1 and the 3-2 transistor portion T3-2 may serve as a diode. That is, each of the 3-1 transistor portion T3-1 and the 3-2 transistor portion T3-2 may be configured to transfer charge in only a preset direction, serving as a rectifier. Depending on a direction required for design, the design of the 3-1 transistor portion T3-1 and the 3-2 transistor portion T3-2 may be changed to transfer charge in another direction.

For convenience of description, although the 3-1 transistor portion T3-1 and the 3-2 transistor portion T3-2 are mainly described, transistor portions corresponding to data lines, respectively, may be further provided.

Static electricity (or electrostatic charge) introduced from the outside during the manufacturing process may have a positive value or a negative value. In the related art, in the case where static electricity is introduced, an electrostatic blocking portion EC' (see FIG. 8) according to the related art may include a conductive line corresponding to a positive static charge and a conductive line corresponding to a negative static charge. However, the construction of the electrostatic blocking portion EC' according to the related art occupies a greater area. Accordingly, it is desirable to replace a portion of the construction of the electrostatic blocking portion EC' according to the related art by an element of the display apparatus.

As shown in FIG. 6, in the case where a positive static charge of static electricity generated during the manufacturing process is introduced, the positive static charge may be discharged to the outside (or a ground line) through the 1-1 conductive line L1-1, the 2-1 conductive line L2-1, and the 2-2 conductive line L2-2. A positive static charge moves through a conductive line to which a relatively high voltage such as a gate high-level voltage is applied. Through this, the pixel circuit may be protected from a positive static charge introduced during the manufacturing process. Here, a positive static charge mentioned in the present specification may denote a static charge having (+).

As shown in FIG. 7, in the case where a negative static charge of static electricity generated during the manufacturing process is introduced, the negative static charge may be discharged to the outside (or a ground line) through the 3-1 conductive line L3-1. A negative static charge moves through a conductive line to which a relatively low voltage such as a gate low-level voltage is applied. Through this, the pixel circuit may be protected from a negative static charge introduced during the manufacturing process. Here, a negative static charge mentioned in the present specification may denote a static charge having (−).

As shown in FIGS. 6 and 7, to move a positive static charge through the 1-1 conductive line L1-1, the 2-1 conductive line L2-1, and the 2-2 conductive line L2-2, and move a negative static charge through the voltage transfer line L3-1, the electrostatic blocking portion EC may include the 3-1 transistor portion T3-1 and the 3-2 transistor portion T3-2. For this purpose, the 3-1 transistor portion T3-1 and the 3-2 transistor portion T3-2 may be designed to serve as diodes such that a current flows in a preset direction.

As an example, a static charge discharged through the 1-1 conductive line L1-1, the 2-1 conductive line L2-1, and the 2-2 conductive line L2-2 is a first static charge, which is a charge introduced from the outside due to static electricity, and may have a positive charge. As an example, a static charge discharged through the 3-1 conductive line L3-1 is a second static charge, which is a charge introduced from the outside due to static electricity, and may have a negative charge.

The voltage transfer line L3-1 may be connected to the power line to which one of the ground power supply voltage (or the above-described second power voltage ELVSS), the reference voltage, and the initialization voltage is applied. As an example, a voltage less than the first driving voltage VGH (e.g., a gate high-level voltage) and greater than the second driving voltage VGL (e.g., a gate low-level voltage) may be applied to the voltage transfer line L3-1.

To discharge the first static charge, the 1-1 conductive line L1-1, the 2-1 conductive line L2-1, and the 2-2 conductive line L2-2 may be electrically connected to the first driving voltage supply line DVL1 to which the first driving voltage (e.g., the gate high-level voltage) is applied. To discharge the second static charge, the 3-1 conductive line L3-1 may be connected to a line to which a voltage of a magnitude less than the first driving voltage VGH (e.g., the gate high-level voltage) is applied.

Preferably, as an example, the voltage transfer line L3-1 may be connected to a power line to which the ground power supply voltage (or the above-described second power voltage ELVSS) is applied. Generally, the width of the power line to which the ground power supply voltage (or the above-described second power voltage ELVSS) is transferred is largest among wirings used in the display panel 10 in a plan view. Accordingly, it may be advantageous that, to discharge more static charge, the voltage transfer line L3-1 is connected to the power line to which the ground power supply voltage (or the above-described second power voltage ELVSS) is applied.

As shown in FIGS. 5 to 7, the module crack detector MCD may be arranged between the display area DA and the short circuit detector OS in a plan view. The short circuit detector OS may be arranged between the module crack detector MCD and the electrostatic blocking portion EC in a plan view.

As an example, the data driver DC may be arranged in the peripheral area PA. Depending on the case, the data driver DC may be disposed on the printed circuit board FPC that will be mounted or attached afterward. However, the electrostatic blocking portion EC may be arranged between the short circuit detector OS and the data driver DC in a plan view.

Figure 8:
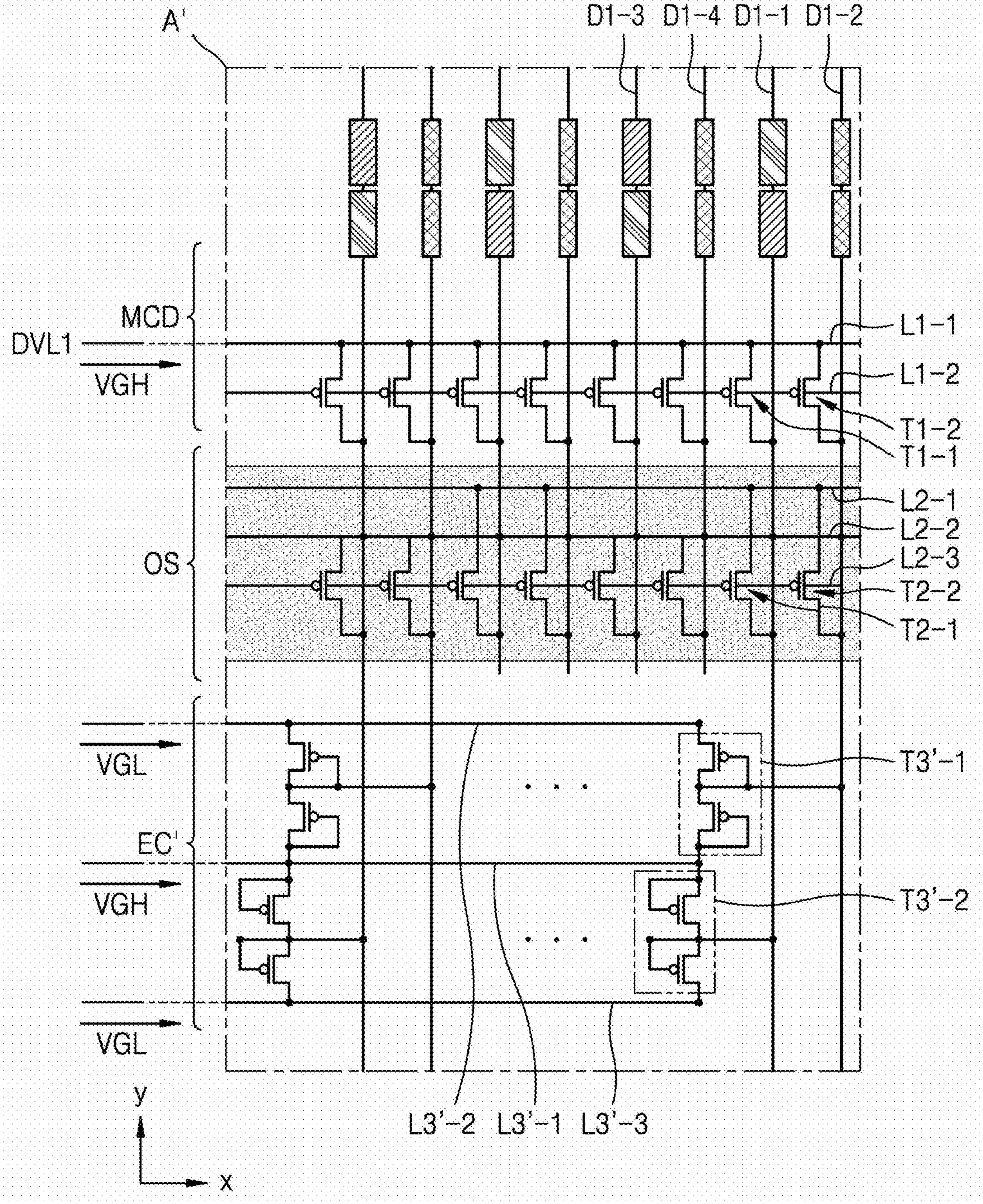
FIG. 8 is a schematic plan view of a region A' corresponding to the region A of FIG. 1 in a display apparatus according to a comparative example.

FIG. 8 is a schematic plan view of a region A' corresponding to the region A of FIG. 1 in a display apparatus according to a comparative example.

For reference, in the description of FIG. 8, contents identical to or repeating those described above may be omitted.

As shown in FIG. 8, an electrostatic blocking portion EC' according to the related art in the region A may include a 3'-1 conductive line L3'-1, a 3'-2 conductive line L3'-2, and a 3'-3 conductive line L3'-3.

The 3'-1 conductive line L3'-1 may be electrically connected to the first driving voltage supply line DVL1 to which the first driving voltage VGH is applied, where the first driving voltage VGH is the above-described gate high-level voltage. The 3'-2 conductive line L3'-2 may be electrically connected to a second driving voltage supply line DVL2 to which the second driving voltage VGL is applied, where the second driving voltage VGL is the above-described gate low-level voltage. The 3'-3 conductive line L3'-3 may be electrically connected to the second driving voltage supply line DVL2 to which the second driving voltage VGL is applied.

As a result, both a positive static charge and a negative static charge of static electricity generated during the manufacturing process may be discharged to the outside (or the ground line) through the electrostatic blocking portion EC' according to the related art. Because the electrostatic blocking portion EC' according to the related art should include both constructions configured to discharge both a positive static charge and a negative static charge to the outside, the electrostatic blocking portion EC' of the related art in the display apparatus according to the comparative example has a wider area in the peripheral area PA than the electrostatic blocking portion EC of the display apparatus according to the embodiment of FIGS. 5 to 7.

Accordingly, it is more advantageous in implementing a display apparatus having a smaller bezel to disperse the function of the electrostatic blocking portion EC' according to the related art in other elements, and to maximally simplify the construction of the electrostatic blocking portion EC' according to the related art.

Both the module crack detector MCD and the short circuit detector OS include the transistor portion that is the same as or similar to the transistor portion of the electrostatic blocking portion EC according to the related art, some functions of the electrostatic blocking portion EC according to the related art may be performed instead by simply changing a connection wiring of the module crack detector MCD and the short circuit detector OS.

After the manufacturing process, the printed circuit board FPC is mounted or attached during the module manufacturing process or the set manufacturing process. After the printed circuit board FPC is mounted or attached, the introduction of external static electricity to the pixel circuit may be prevented by the electrostatic prevention structure or electrostatic prevention circuit built in the printed circuit board FPC itself. Accordingly, it is important to reduce the area of the electrostatic blocking portion which is only desirable for some of the overall manufacturing process.

According to the embodiment, the display apparatus in which damage to a circuit caused by ESD may be prevented and a smaller bezel may be implemented, may be implemented. However, the scope of the disclosure is not limited by this effect.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:

a display panel including a display area and a peripheral area adjacent to the display area, wherein the display panel includes a plurality of gate lines and a plurality of data lines;

a scan driver arranged in the peripheral area, connected to the plurality of gate lines, and configured to be driven by a first driving voltage and a second driving voltage less than the first driving voltage;

a module crack detector arranged in the peripheral area and connected to the plurality of data lines;

a short circuit detector arranged in the peripheral area and connected to the plurality of data lines; and an electrostatic blocking portion arranged in the peripheral area, connected to the plurality of data lines, and including a voltage transfer line to which an intermediate voltage less than the first driving voltage and greater than the second driving voltage is applied.

2. The display apparatus of claim 1, wherein the intermediate voltage applied to the voltage transfer line is one of a ground power supply voltage, a reference voltage, and an initialization voltage.

3. The display apparatus of claim 1, further comprising a driving voltage supply line to which the first driving voltage is applied, wherein the driving voltage supply line is connected to the module crack detector.

4. The display apparatus of claim 3, wherein the display panel includes a first data line configured to transfer a first data signal to a first pixel line, and a second data line configured to transfer a second data signal to a second pixel line, wherein the first data line and the second data line are included in the plurality of data lines.

5. The display apparatus of claim 4, wherein the module crack detector includes a 1-1 conductive line electrically connected to the driving voltage supply line, and a 1-1 transistor portion electrically connecting the first data line to the 1-1 conductive line.

6. The display apparatus of claim 5, wherein the module crack detector further includes a 1-2 transistor portion electrically connecting the second data line to the 1-1 conductive line.

7. The display apparatus of claim 6, wherein the 1-1 conductive line is configured to transfer a first static charge introduced from outside to a ground line.

8. The display apparatus of claim 7, wherein the first static charge is a positive charge.

9. The display apparatus of claim 4, wherein the short circuit detector includes:

a 2-1 conductive line electrically connected to the driving voltage supply line; and a 2-1 transistor portion connecting the first data line to the 2-1 conductive line.

10. The display apparatus of claim 9, wherein the short circuit detector further includes:

a 2-2 conductive line electrically connected to the driving voltage supply line; and a 2-2 transistor portion connecting a third data line to the 2-2 conductive line, wherein the third data line is included in the plurality of data lines and configured to transfer a third data signal to a third pixel line.

11. The display apparatus of claim 10, wherein the short circuit detector further includes a 2-3 conductive line connected to a gate of the 2-1 transistor portion and a gate of the 2-2 transistor portion.

12. The display apparatus of claim 4, wherein the voltage transfer line is electrically connected to a power line to which the intermediate voltage is applied.

13. The display apparatus of claim 12, wherein the intermediate voltage is one of a ground power supply voltage, a reference voltage, and an initialization voltage.

14. The display apparatus of claim 12, wherein the intermediate voltage is a ground power supply voltage, and the voltage transfer line is connected to a power ground line to which the ground power supply voltage is applied.

15. The display apparatus of claim 14, wherein the electrostatic blocking portion further includes a 3-1 transistor portion connecting the second data line to the voltage transfer line.

16. The display apparatus of claim 15, wherein the electrostatic blocking portion further includes a 3-2 transistor portion connecting the first data line to the voltage transfer line.

17. The display apparatus of claim 16, wherein the voltage transfer line is configured to transfer a second static charge introduced from outside to the power ground line.

18. The display apparatus of claim 17, wherein the second static charge is a negative charge.

19. The display apparatus of claim 14, wherein, in a plan view, a width of the power ground line is greater than a width of the driving voltage supply line.

20. The display apparatus of claim 1, further comprising a data driver arranged in the peripheral area, wherein, in a plan view, the module crack detector is arranged between the display area and the short circuit detector, the short circuit detector is arranged between the module crack detector and the electrostatic blocking portion, and the electrostatic blocking portion is arranged between the short circuit detector and the data driver.

* * * * *